United States Patent [19]
King

[11] 3,953,081
[45] Apr. 27, 1976

[54] ANTILOCKING BRAKING SYSTEM
[76] Inventor: William Roy King, 1909 Sunshine Square, Longview, Tex. 75601
[22] Filed: Nov. 11, 1974
[21] Appl. No.: 522,477

[52] U.S. Cl. .......................... 303/21 CH; 188/181 T
[51] Int. Cl.² ......................................... B60T 8/093
[58] Field of Search ........... 188/2 A, 181; 303/21 F, 303/21 CH

[56] References Cited
UNITED STATES PATENTS

| | | | |
|---|---|---|---|
| 2,868,338 | 1/1959 | Lucien et al. | 188/181 A |
| 3,294,204 | 12/1966 | Zubaty | 188/181 A |
| 3,711,162 | 1/1973 | Steinbrenner et al. | 303/21 CH X |
| 3,724,610 | 4/1973 | Caero | 188/181 T |

Primary Examiner—Duane A. Reger
Attorney, Agent, or Firm—Ned L. Conley; Murray Robinson; David M. Ostfeld

[57] ABSTRACT

An improved anitlocking vehicle braking system and method for stopping, for example, automobiles utilizing uniquely designed fluid communication means to regulate the fluid pressure applied to individual wheel conventional braking devices. The system includes a comparator means at each braking device which cooperates with other components of the system to detect the difference between the force generated from the frictional loading between the brake shoe and the drum and the force between the tire and the road. This difference is translated to movement of a valve which restricts the supply of brake fluid to the individual wheel to the extent necessary to prevent sufficient force being applied to force the wheels to a locked condition or to inefficient braking operation.

25 Claims, 3 Drawing Figures

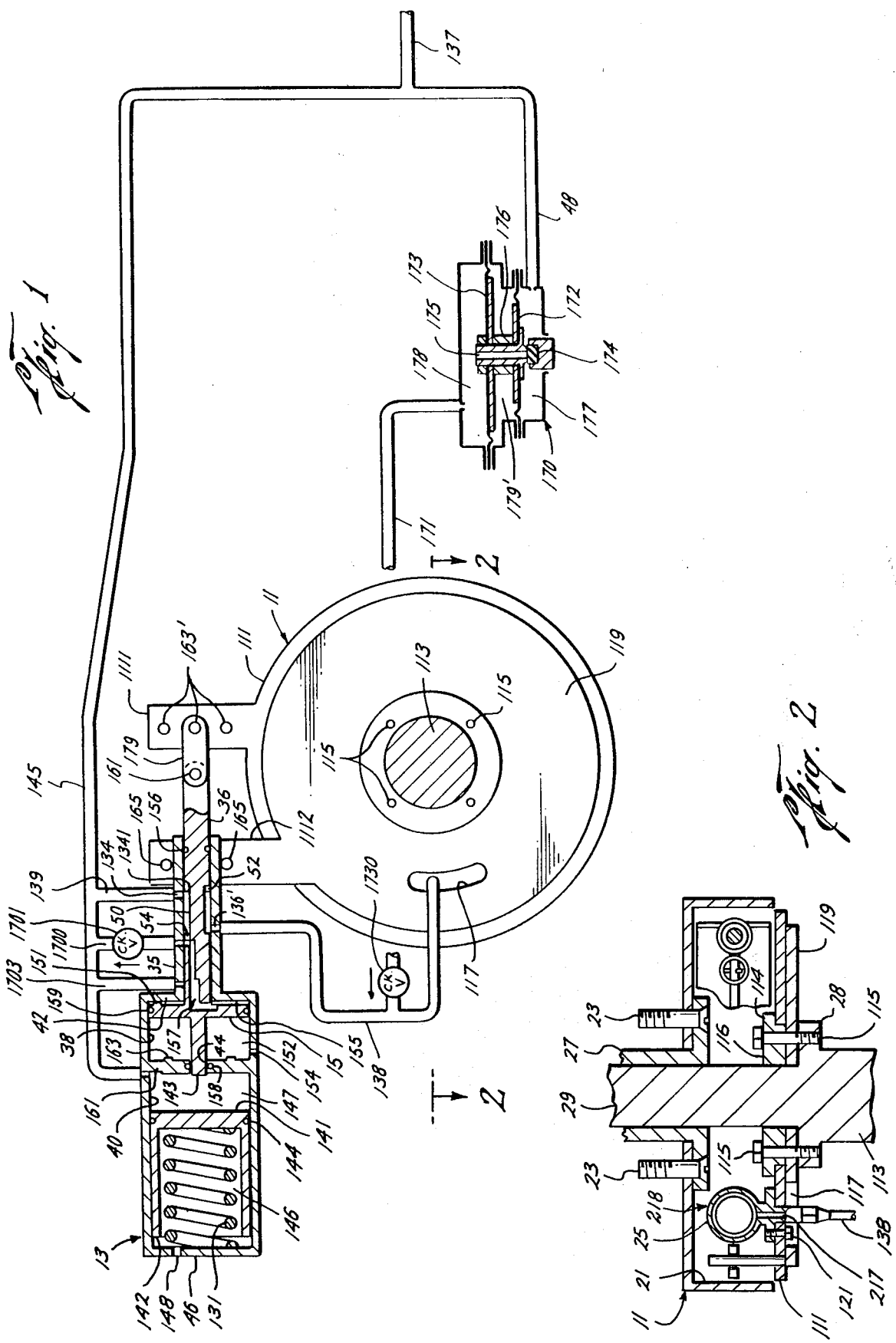

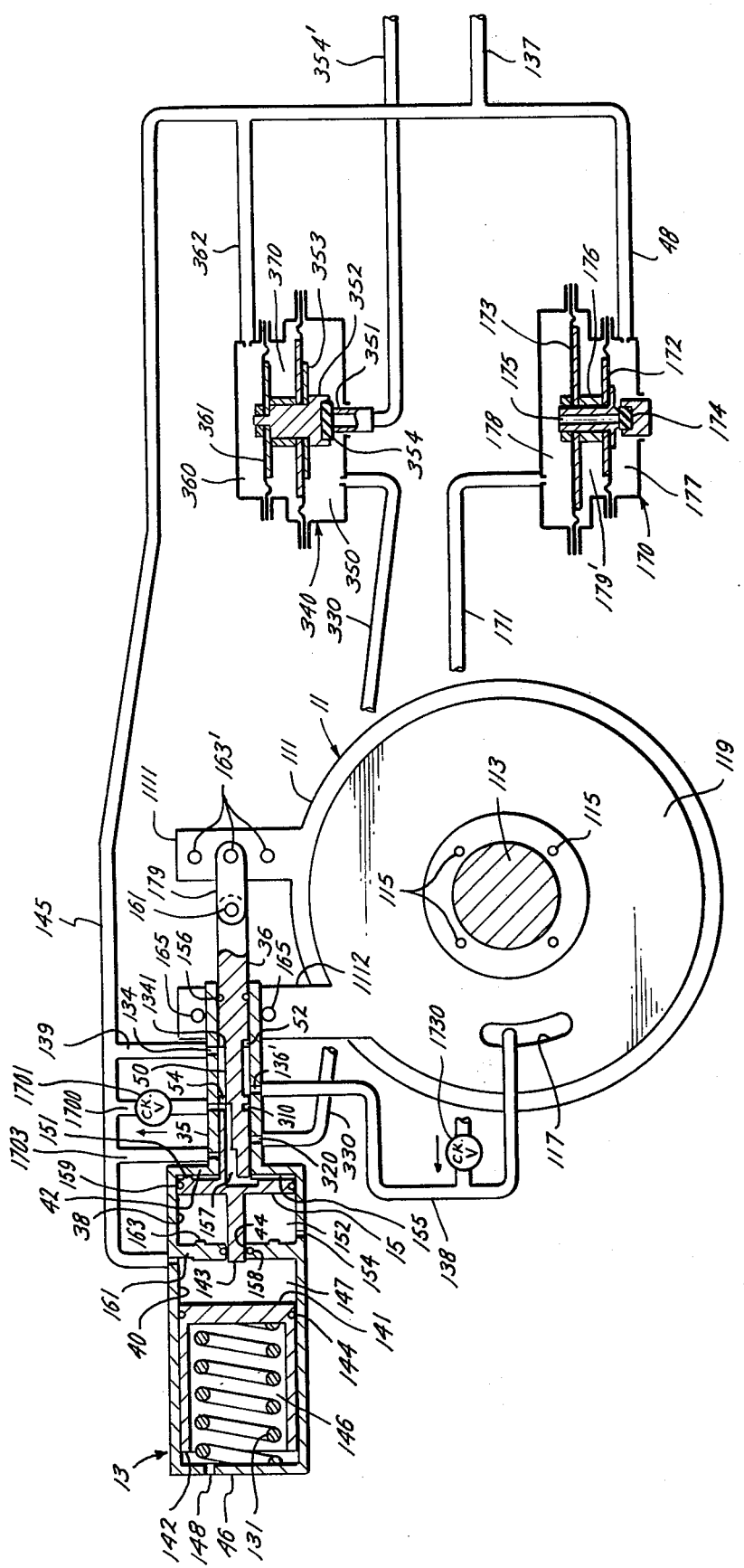

ANTILOCKING BRAKING SYSTEM

BACKGROUND OF THE INVENTION

1. Field of the Invention

The present invention relates to an antilocking vehicle braking system and method for stopping vehicles without wheel lock. The present invention has been found to be particularly useful in the automobile braking art, especially as a device for individual tire skid control, and hence, will be discussed with particular reference thereto. However, the present invention is applicable to many other types of braking system as well, not only automobiles and trucks, as long as fluid braking systems are used in combination with wheels, and the term "automobile" is used herein to include vehicles of all sorts such as airplanes, tractors, and trucks.

2. Description of the Prior Art

When a brake is applied to the wheel of a vehicle, there is a tendency for the surface velocity of the tire to be reduced to below the velocity of the vehicle. As the ratio of these velocities is reduced, i.e., as the tire begins to slip on the road, braking force begins to increase to a maximum when the tire surface velocity is from about 10% to about 30% below vehicle velocity, but beyond about 30% slip, braking force decreases substantially, until the wheel is locked from rotating. Thus, it is apparent that as the operator of the vehicle increases the fluid pressure in the braking system, and, thus, the force of the brake shoes on the brake drum, beyond a certain optimum, actual braking force at the tire surface begins to decrease, thereby putting the vehicle in danger of a skid.

To reduce the likelihood of such a skid, antilock braking systems have been developed. Antilocking braking systems usually include means to control the flow of fluid between the brake fluid supply and the individual brakes based on a sensing of a skid or wheel lock condition. This involves the transmitting of an indication of vehicle motion under braking conditions from the tire to cause generation of a control signal. This transmission and the operation of a control system by the signal must be done in a manner such that environmental factors will not affect the signal transmitted, the device must be reliable in operation for a long period of time and consistent in its indication, and vehicle operation must not be impeded and made unsafe through failure of the system.

Several types of antilocking vehicle braking systems and methods have been known and used before, and typical examples thereof in the automobile brake system art are shown in U.S. Pat. 3,735,844, issued May 29, 1973, H. N. Barnes; U.S. Pat. 3,813,130, issued May 28, 1974, to M. Inada; U.S. Pat. 2,257,628, issued Sept. 30, 1941, to N. E. Wahlberg; U.S. Pat. 2,471,956, issued May 31, 1949, to J. W. F. Holl; U.S. Pat. 3,011,831, issued Dec. 5, 1961, to H. W. Trevaskis; U.S. Pat. 3,611,284, issued Oct. 5, 1971, to J. P. G. Lewis; U.S. Pat. 3,529,872, issued Sept. 22, 1970, to R. E. Mitton; and U.S. Pat. 3,542,164, issued Nov. 24, 1970, to F. R. Mortimer.

The Inada, Wahlberg, Holl, Mitton and Trevaskis antiskid brake devices utilize multiple wheel control which does not permit individual adaptation of torque per wheel and wheel brake for conditions encountered by that wheel.

In addition, the Inada device uses an electrical control system, as does the Mitton device, which is not desirable under some circumstances. Also, several of the systems use motion sensors in the individual wheels of the vehicle to determine torque imbalance.

The Trevaskis device also vents brake fluid from the brake supply without shutting off the brake supply in a manner that causes a sudden change in braking force, which is operably undesirable.

The Lewis device, although operating with each individual wheel, uses wheel motion to sense braking problems through electrical means. It also uses on/off control to regulate power from the central brake fluid supply without linearly lowering the braking force which result in sudden changes in braking force, which is operably undesirable.

The Barnes device reacts individually to each wheel. It, however, although totally hydraulic, does not gradually lower braking pressure to the desired amount but has volumes for lowering its pressure thereby producing an uneven and intermittent braking effect.

SUMMARY OF THE INVENTION

The present invention uses a very simple but highly effective design to cut off the braking supply and then linearly lower the braking pressure applied to an ordinary brake of a wheel or wheels to prevent wheel lock and skidding. The present invention, while utilizing valve means and variable volume means, uses them in relationship to the torque differential created by the difference in moment of the force of the brake fluid acting in conjunction with the brake and the reactive force of the ground tending to keep the wheel rolling to linearly control the brake fluid pressure and, therefore, the brake torque.

Also, a minimum braking force is always maintained on the wheel proportional to the requested braking force of the operator. This is done in order to maintaim some amount of braking force in the system while attempting to react to wheel lock.

In addition, the system is also adaptable to penumatic operations by implementing exhaust means to quickly lower the range of brake pressure proportional to the requested braking force for extreme variations in brake torque to prevent wheel lock.

BRIEF DESCRIPTION OF THE DRAWINGS

For a further understanding of the nature and object of the present invention, reference should be had to the following detailed description, taken in conjunction with the accompanying drawings, in which like parts are given like referenced numerals and wherein:

FIG. 1 is a partially schematic sectional view of the preferred embodiment of the apparatus of the present invention;

FIG. 2 is a transverse, partial horizontal sectional view of the embodiment of the apparatus shown in FIG. 1, taken along line 2—2 of FIG. 1; and FIG. 3 is a view of another embodiment of the invention.

DETAILED DESCRIPTION OF THE PREFERRED EMBODIMENT

Introduction

The antilocking braking system of the preferred embodiment may be used to regulate braking power on any set of one or more wheels wherein it is important that braking power applied to a wheel be regulated in a reliable manner to prevent wheel lock or inefficient braking and where some amount of braking force to each wheel is always available when the brakes are applied. A particularly important area of application of the present invention is land vehicle braking using drum brakes wherein the braking power is supplied from a brake fluid source to a set of wheels and each wheel must be able to act individually with respect to environmental conditions, and, therefore, the preferred embodiment will be described with respect to such an application. However, it should be realized that the present invention could be applied to, for example, any application where it is desired to regulate fluid braking power to a set of one or more brakes independently.

In the preferred embodiment of the present invention, the braking of the vehicle is accomplished through the simultaneous application of brake fluid pressure to each wheel of the vehicle that is equipped with brake drums. The braking of the vehicle is accomplished in such a manner that the amount of brake fluid supplied to each wheel is regulated and, if necessary, exhausted from the wheel's brake so that the moment exerted by the ground against the wheel tending to force the wheel to continue to rotate is equal to or greater than the moment resulting from the frictional force between the brake shoe and the drum. The regulation of brake fluid is accomplished through the use of a valve at the brake fluid inlet to each brake drum, the position of the valve being regulated by the difference between the moment exerted by the brake shoe upon the brake drum and the moment exerted by the road upon the tire.

Therefore, when braking fluid is applied to a wheel from a central brake system by the vehicle operator, the resultant torque from the difference in moments is translated to position the valve for each wheel. In addition, the hydraulic braking force applied from the central system will regulate the position of a set of pistons which cooperate with the wheel torque translation means in regulating brake power. Relative position of these pistons and the valve will directly regulate the amount of brake fluid flowing to the brake drum through the valve, and, therefore, the amount of brake fluid pressure that is applied to each brake drum resulting in force between the brake shoe and the brake drum to prevent the wheel from locking.

Structure and Its Method of Use

Referring particularly to FIGS. 1 and 2, there is shown the brake drum assembly 11 for the wheel as it is used to transmit braking force to the wheel when braking action is supplied by the operator of the vehicle through the central brake fluid supply system. The brake drum assembly is mounted on the axle housing 113, which has an axle 29 extending therefrom, and a housing flange 119 mounted thereon. A torque transmission plate 111 is rotatably mounted on the face of flange 119, being positioned concentric thereto and held in place by the flange 114 of a plate 116, which is bolted to the axle 113 by bolts 115 connected to axle flange 28. The distance from the flange 114 to flange 119 is greater than the thickness of the plate 111, so that the plate is not clamped against relative rotation.

A conventional brake cylinder assembly 218 is mounted on torque transmission plate 111 by bolt 121, and brake fluid conduit 138 which provides fluid to the cylinder 25 passes through arcuate slot 117 in the flange 119.

Brake fluid conduit 138 is supplied fluid from brake fluid supply 137 through a valve assembly 13, by orifice 136' which comprises a first cylinder 35 having a slide valve 36 with inlet right angle seat 1341 therein, a second coaxial cylinder 38 connected at one end of the slide valve cylinder, and a third coaxial cylinder 40 mounted on the opposite end of the second cylinder. The slide valve is provided at one end with an enlarged diameter piston 15 which sealingly engages the wall of the cylinder 38 by means of an O-ring 159 fitted around the piston. The face of the piston 15 toward the cylinder 35 has a projection 151 extending toward the end 42 of the cylinder 38.

The opposite end of the cylinder 38 is closed by a wall 161 having an inwardly facing annular ridge 163 thereon, and a central bore 44 which sealingly engages, by means of an O-ring 158, an axial extension 143 on the piston 15 and is perforated by relief opening 154.

Cylinder 40 is closed at one end by the wall 161, and at its opposite end by a wall 46 which is perforated by a relief opening 148. This cylinder contains a free piston 141 which sealingly engages the wall of cylinder 40 by means of an O-ring 144 and which is provided with a cylindrical skirt 142 which is adapted to engage wall 46. A compression spring 131 carried within the skirt 142 in chamber 146 bears against the wall 46 and biases the piston toward the right, as viewed in FIG. 1.

Cylinder 35, in the embodiment shown in FIG. 1, is provided with four ports through its walls, three of which are connected to the brake fluid supply line 145 through lines 139, 1700, and 1703. Line 1700 is provided with a check valve 1701 which permits flow outwardly from the cylinder 35 to fluid supply line 145 but prevents flow in the opposite direction. The fourth port is connected to line 138 which leads to the wheel brake cylinder 25.

The slide valve 36 has a reduced diameter portion 50 which, in the position shown in the drawing, provides fluid communication between line 139 with inlet orifice 134 and line 138. A longitudinally extending slot 52 intersects the reduced diameter portion 50 in alignment with line 138, and a longitudinally extending slot 54 intersects the reduced diameter portion 50 in a position to provide communication, in the position shown, between the reduced diameter portion and line 1700. A fluid passageway 157 extends from slot 54 to the face of piston 15 which is toward the wall 42.

The slide valve 36 sealingly engages the cylinder 35 by means of O-ring 156, and has an extension out the right end, as viewed in FIG. 1, of the cylinder. This extension is connected by a double-pivoted link 179, to an arm 1111 which extends substantially radially from the torque transmission plate 111. Arm 1111 is provided with a plurality of holes 163', at varying distances from the center of plate 111, at which the link 179 can be connected, so as to obtain different moment arms as may be required, as is hereinafter explained.

The valve assembly 13 is rigidly mounted on an arm 1112 which extends from cover plate 119 substantially parallel to, but spaced away from, arm 1111. The valve assembly is clamped to the arm 1112 by a clamp which fastens through holes 165.

Brake fluid supply line 137 is connected to the brake master cylinder from which it receives brake fluid under pressure to actuate the brakes of a vehicle. One branch 145 thereof leads to the valve assembly 13 and another branch 48 leads to a proportional regulator 170.

The proportional regulator 170 is divided into three chambers 177, 178 and 179' by a first, smaller diameter diaphragm 172 and a second larger diameter diaphragm 173. A body member 176 connects and extends through the two diaphragms, and a passageway 175 through this body provides fluid communication between chambers 117 and 178. In the position of the diaphragms shown in the drawing, passageway 175 is closed by a resilient seat 174. Chamber 179' is sealed by the diaphragms against any communication with the other chambers. Chamber 178 is connected by a fluid line 171, and through a check valve 1730, to fluid conduit 138.

When the brakes are not being applied, so that the brake fluid system is at substantially atmospheric pressure, spring 131 in the valve assembly 13 forces piston 141 to the right, as shown in the drawing, against the end of the extension 143 on piston 15. The spring has sufficient strength to hold the slide valve 36 in the position shown in the drawing when such a pressure condition exists.

Also, when the brakes are not being applied, the diaphragms 172 and 173 in the proportional regulator are in the position shown in the drawing. There is no engagement of the brake shoes with the brake drum, so that there is no tendency for the torque transmission plate 111 to rotate.

When braking action is first applied by the vehicle operator, the antilocking brake system will initially react as any conventional braking system, as shown in FIG. 1, by permitting free flow of braking fluid from supply 137 to flow through the inlet conduit 139 and brake fluid conduit 138 of slide valve 36. The brake fluid will enter the brake cylinder 25 through orifice 217 thereby causing the normal action of a drum brake to occur, the brake shoe expanding with its brake lining to come in contact with the inner peripheral surface 21 of the brake drum assembly 11.

When brake fluid is first supplied through brake fluid supply 137, brake fluid also flows through spring chamber inlet 145 to chamber 147 compressing spring 131 as the result of fluid pressure acting on piston 141. The force exerted by the brake fluid in chamber 147 against piston 141 will continue to compress spring 131 until either the potential force of the spring, measured by the product of its spring constant and the distance it has been compressed, equals the pressure of the brake fluid in chamber 147 over the area of the piston 141 or until the spring 131 has been compressed so that stop ring 142 engages wall 46. Normally, the spring is selected so that the minimum braking pressure supplied to the brake cylinder 25, either through brake fluid supply 137 directly or by regulator 170, would be sufficient to compress spring 131 to the stop position.

Also, brake fluid will enter line 48 and chamber 177 forcing diaphragm 172 upward thereby permitting brake fluid to enter chamber 178 through passageway 175 and to line 171. This flow will continue until the force due to the pressure in chamber 177 acting over the area of the diaphragm 72 equals the force due to the pressure in chamber 178 acting over the area of the diaphragm 173 at which event a vent body member 176 will be permitted to return to the position shown on the drawings and passageway 175 is closed by resilient seat 174.

Of course, inner peripheral surface 21 is mechanically connected by stud bolts 23 and connecting plate 27 to the axle 29. Therefore, the expansion of the brake shoe until the brake lining comes in contact with the inner peripheral surface 21 of the brake drum assembly 11 causes physical contact to take place between the rotating and non-rotating portions of the wheel. This causes force to be exerted between the inner peripheral surface 21 (the drum) and the brake shoe which in turn results in a force being applied against the rotation of the wheel on the ground, thereby causing a resultant torque to be applied to the torque transmission plate 111. Torque transmission plate 111 is free to rotate in both directions. Rotation clockwise, as seen in FIG. 1, is limited by the permissible motion of piston 15 as stop 151 comes in contact with the wall 42 of four-way valve assembly 13.

If all braking conditions were perfect, the moment resulting from the braking force would not be sufficient to overcome the wheel's ability to roll for optimal braking force while the vehicle is still in motion: i.e.: the reactive force trying to keep the wheel rolling would be greater than the drum braking force that tries to stop it from rolling and of a sufficient magnitude greater to give efficient braking force. So long as the wheel is rotating, the frictional force between the drum and the shoe applies a moment to the torque transmission plate 111 sufficient to hold the slide valve 36 in the position shown in the drawing, despite the fluid pressure being applied against the piston 15. Therefore, under this condition, the antilocking braking system would not come into effect and valve 35 would stay in the position permitting flow of brake fluid through brake supply 137 to go into inlet 139 and into valve outlet 138 and thence to brake cylinder 25. However, if sufficient brake fluid pressure is applied to cause the brake shoes to bear against the drum with sufficient force to produce excessive wheel slip, the pressure against piston 15 will be sufficient to pull slide valve 36 to the left, so that transmission plate 111 will begin to rotate counterclockwise, as shown in FIG. 1. This will happen independently for each wheel.

The point at which piston 15 causes counterclockwise rotation of the plate 111 is determined by the size of piston 15 and the length of the moment arm, i.e., the selection of the hole 163' in arm 1111 to which link 179 is attached. These are selected to insure that movement of the piston 15 occurs before wheel slippage becomes excessive.

As slide valve 36 moves to the left, it will begin to close off fluid line 139. At the same time chamber 155 between piston 15 and wall 42 is enlarged, tending to decrease the pressure in the system. When fluid line 139 is completely closed off, further movement of piston 15 will tend to substantially diminish the pressure in line 138 and in the wheel cylinder 25.

As the antilocking braking system lowers the actual brake pressure applied to the brake cylinder 25 from that requested by the vehicle operator through brake fluid supply 137, it is apparent that, in the absence of any controverting effect, before valve 36 opens port on line 1703 and 145, the brake fluid pressure may drop sufficiently, as chamber 155 is enlarged, that no effective force is left between the brake shoe and the inner peripheral surface 21 of brake drum assembly 11. This may be true if the braking is occurring when the vehicle is moving forward on a very icy or slick surface and would always be true if the vehicle was moving in reverse. Under these circumstances, there would be no effective braking force left at the command of the vehicle operator to stop the vehicle. Therefore, regulator means are provided as a component of the system to maintain a minimum brake fluid pressure in brake fluid conduit 138 to supply brake fluid to brake cylinder 25. Proportional regulator 170 is supplied with a proportional setting to hold the brake shoes out and in contact with the inner peripheral surface 21 of the brake drum assembly 11.

When the fluid pressure in brake fluid conduit 138 falls below the fluid pressure maintained by proportional regulator 170 in conduit 171, the maintained pressure being a result of the proportional relationship to the fluid pressure in brake fluid supply 137, then brake fluid is permitted to flow through line 171 and through check valve 1730 into brake fluid conduit 138. It is apparent the ratio of the areas of the diaphragms 172 and 173 is selected so as to maintain a desired ratio between applied brake fluid pressure and a desired minimum pressure to be applied to insure substantial braking without excessive wheel slip. Therefore, proportional regulator 170 will always keep a minimum pressure proportional to the pressure requested by the vehicle operator as indicated by the pressure of brake fluid supply 137. In this manner, a minimum braking fluid pressure will always be maintained for brake cylinder 25 no matter what the distance of travel of piston 15 in chamber 152.

This minimum braking fluid pressure must be low enough to reduce the braking force applied to the brake shoes sufficiently to allow the wheel to begin rotating again at a surface velocity which preferably is 70% to 90% of vehicle velocity. When this occurs, skidding is stopped, or at least diminished, so that the braking is increased, thereby applying an increased clockwise moment on plate 111. The increased moment, combined with the reduction of fluid pressure on piston 15 which was holding the plate in counterclockwise position, causes the plate 111 to tend to rotate clockwise again. The fluid system for this wheel is at this point closed off from the fluid supply in lines 137 and 145, forming a closed system. Thus, clockwise rotation of plate 111 pulls on piston 15, thereby increasing the pressure in the system toward the pressure in lines 137 and 145. This will continue until pressure against piston 15 increases the counterclockwise torque until it equals the clockwise torque or until piston 15 reaches the end of its travel.

Of course, when the operator no longer wishes to have braking force applied, he will so indicate by taking his foot off the brake thereby reducing brake fluid pressure in brake fluid supply 137 to substantially atmospheric pressure. This will permit fluid to flow through check valve 1701 back to line 145, thereby reducing fluid from conduit 138 and chamber 155 as well as from line 171, through check valve 1730. Also, the fluid in chamber 147 will vent through line 145 permitting spring 131 to expand forcing out the fluid in chamber 155 through the action of piston 141, valve stem 143, and piston 15. The movement of piston 141 by the spring 131 pushing valve stem 143 also restores torque transmission plate 111 and torque transmission plate extension 1111 to their extreme position away from valve assembly 13. This would be true even if the vehicle had completely stopped with the antilocking brake system activated preventing fluid communication through supply inlet 139 for venting the brake when the operator stopped requesting braking force.

Therefore, at any time the antilocking braking system is actively engaged in preventing brake lock or inefficient application of braking force, as soon as the wheel begins to rotate or when the vehicle stops or the operator no longer wishes braking, the torque transmission plate 111 will rotate away from four-way valve assembly 13 with torque transmission plate extension 1111. This will also cause fourway valve 135 to more eventually to a position where full brake fluid power will again be supplied through supply inlet 139. Therefore, the normal operation of the system is to always return the system to a position where the operator has full braking power available to him for the next braking operation.

If, because the vehicle is braked while in reverse or for other reason piston 15 reaches stop extension ring 163 of wall 161, then brake fluid from supply 137 is allowed to flow through line 1703 to four-way valve 135 and into brake fluid conduit 138 to supply full braking power in reverse. The antilocking system is inoperative under such conditions.

FIG. 3 illustrates the configuration of the antilocking braking system with an emergency orifice vent 320 included in four-way valve 135 so that it becomes a five-way valve 135 instead of a four-way valve. This is especially useful in pneumatic systems, wherein the compressibility of the braking medium may preclude the possibility of piston 15 being able to react quickly enough under certain rod conditions such as, for example, going from excellent ground conditions to an icy skid, to provide sufficient pressure lowering capability to prevent loss of brake efficiency or brake lock. Except as hereinafter described, this embodiment operates in the manner as the embodiment of FIGS. 1 and 2.

Emergency orifice vent 320 is aligned with an annular groove 310 in slide valve 36, which connects with longitudinal slot 54. The vent 320 is in fluid communication with a conduit 330, which is connected to a chamber 350 in a back pressure regulator 340. Proportional regulator 340 is composed of two fluid tight chambers, vent chamber 350 and maximum pressure chamber 360 with a chamber 370 therebetween. The chambers are separated by diaphragms 353 and 361, which are fastened to a central body member 352. This body member has a resilient seat 354 thereon positioned to close on outlet 351 which connects to brake fluid lines 354'. The upper chamber 360 is connected to the brake fluid supply pressure through line 362. The diaphragms are proportioned so that the force of supply fluid pressure in the upper chamber holds the seat 354 in engagement with outlet 351 unless the pressure in chamber 350 is somewhat in excess of the pressure in chamber 179 or regulator 170.

In the operation of this embodiment, when the wheel begins to slip excessively and the piston 15 moves to the left, the groove 310 moves into register with orifice 320, allowing fluid to flow from the system, through line 330, to back pressure regulator 340. So long as the pressure is in excess of the designed amount above the pressure of regulator 170, fluid will flow from the chamber to exhaust through return line 354', thereby quickly exhausting the system to near the pressure of regulator 170.

Under normal conditions, as described above for FIG. 1, the antilocking brake system as shown in FIG. 1 would be sufficient to maintain braking force at an efficient state and prevent wheel lock. However, where a large difference is necessary between the actual braking pressure applied to the brake cylinder 25 and the braking cylinder 25 and the braking pressure of brake fluid supply 137 in order to prevent wheel lock, the system of FIG. 3 will permit immediate exhaustion of braking fluid from chamber 155 and brake cylinder 25 upon the five-way valve 135 reaching the position where valve opening 310 is opposite orifice 320. This extra valve position, therefore, permits quick escape of brake fluid to reduce the pressure exerting force on brake cylinder 25. The reduction will place the pressure of the remaining fluid in a range where the expansion of piston 15 may cause sufficient drop in fluid pressure to prevent excessive wheel slip.

If a constant pressure regulator were substituted for proportional regulator 170, then a constant pressure regulator would have to be substituted for regulator 340.

Having the system perform all of its functions in a completely hydraulic or pneumatic manner allows the system to quickly react when the operator changes commands for brake force and to be adaptable to changing environmental and mechanical circumstance of the vehicle to which it is attached. It is noted that in the preferred embodiment no electronic equipment is needed to control any of the parts of the system, resulting in a very simple but reliable design.

Although the system described in detail supra has been found to be most satisfactory and preferred, many variations in structure and method are, of course, possible. For example, the system can also be adapted for disc brake operation. Also, the system can be adapted to any type of braking fluid. Additionally, mounting adjustment of the valve can be made through a continuous rather than a discrete adjustment of leverage. Additionally, the shape of the edge of the reduced diameter portion of the four-way or five-way valve may be adjusted from a right angle to another shape for different flow characteristics. Moreover, diaphragms rather than pistons and cylinders may be used in the pneumatic case. Additionally, mechanical stops could be placed on the shaft rather than stops on the spring mechanism and pistons. Also, the system could be adapted to airplane wheels, motorcycles, or other types of vehicles having at least one wheel. Additionally, constant pressure regulators or combinations of constant and proportional regulators could be used instead of proportional regulators. Also, braking forces rather than springs could be used for restoration purposes of the system which might also eliminate the need for mechancial stops. Moreover, the reverse pulling piston 15 might be located in a different place such as connected to torque transmission plate extension 1111 which might also require additional mechanical stops.

The above are, of course, merely exemplary of the possible changes or variations. Because many varying and different embodiments may be made within the scope of the inventive concept herein taught and because many modifications may be made in the embodiment herein detailed in accordance with the descriptive requirements of the law, it is understood that the details herein arc to be interpreted as illustrative and not in a limiting sense.

What is claimed as inventive is:

1. In a fluid braking system including an individual wheel braking system and source of pressurized braking fluid connected thereto, the improvement which comprises:
means for blocking fluid flow between the individual wheel braking system and the source of pressurized braking fluid, in response to excessive slipping of the individual wheel, and
means for continuous varying of the pressure in the individual wheel braking system while such fluid flow is blocked.

2. In a fluid braking system including an individual wheel braking system and source of pressurized braking fluid connected thereto, the improvement which comprises:
means for blocking fluid flow between the individual wheel braking system and the source of pressurized braking fluid, in response to excessive slipping of the individual wheel,
means for reducing the pressure in the individual wheel braking system while such fluid flow is blocked, and
a proportional regulator connected to provide fluid communication to said individual wheel braking system and adapted to provide a fluid pressure at a constant proportion to the pressure provided by the source of pressurized braking fluid.

3. An antiskid braking system for use with a wheel brake including a fluid system, a rotatable brake durm and relatively stationary brake shoes mounted on an axle housing, and wherein brake fluid under pressure is supplied to the wheel brake, comprising:
torque differential transmission means for sensing the differential between a first torque of the wheel and the ground and a second torque of the brake to which the brake shoe are connected, said torque differential transmission means being rotatably connected to the axle housing,
valve means for controlling the flow of brake fluid from the brake fluid supply to the wheel brake upon actuation by said torque differential transmission means and in fluid communication with brake fluid supply and with the wheel brake fluid system, and
expandable volume means connected to said valve means and in fluid communication with the brake fluid supply, for reducing the fluid pressure in the wheel brake fluid system upon movement of said torque differential means when the torque of the ground against the wheel is reduced below the brake torque.

4. The antiskid braking system of claim 3 wherein there is further included
evacuation means for venting brake fluid from said valve means in fluid communication with said valve means.

5. The antiskid braking stem of claim 4 wherein there is further included
restoration means engageable with said valve means for restoring said valve means to the position permitting maximum flow from the brake fluid supply to the wheel brake fluid system and for restoring said expandable volume means ot its minimum volume when the pressure of the brake fluid supply is reduced to ambient.

6. The antiskid braking system of claim 5 wherein said evacuation means vents said valve means when the pressure in said valve means exceeds the pressure in the brake fluid supply.

7. The antiskid braking system of claim 5 wherein said torque differential transmission means includes stop means for limiting the rotational travel of said torque differential transmission means.

8. The antiskid braking system of claim 5 wherein said valve means permits the full flow of fluid from the brake fluid supply at one of the extreme positions of travel of said valve means.

9. The antiskid braking system of claim 5 wherein there is further included a slidable connection between said valve means and said torque differential transmission means and said torque differential transmission means includes adjustable leverage means for adjusting the mechanical leverage of said slidable connection between said valve means and said torque differential transmission means.

10. The antiskid braking system of claim 3 wherein said expandable volume means includes stop means for limiting the maximum volume and minimum volume of said expandable volume means.

11. The antiskid braking system of claim 10 wherein said expandable volume means includes a chamber composed of a cylinder with a piston.

12. The antiskid braking system of claim 5 wherein there is further included minimum pressure means for preventing the brake fluid pressure in the wheel brake fluid system from falling below a minimum pressure, said minimum pressure means being in fluid communication with the wheel brake fluid system and the brake fluid supply.

13. The antiskid system of claim 12 wherein said minimum pressure means maintains said minimum brake fluid pressure proportional to the pressure of the brake fluid supply.

14. The antiskid braking system of claim 13 wherein there is further included:
maximum pressure regulation means for venting the fluid pressure in said valve means to a maximum pressure at a position of travel of said valve means;
additional means as a part of said valve means for permitting the venting of said valve means to said maximum pressure regulation means at a fixed position of said valve means; and
return means for returning the brake fluid from said maximum pressure regulation means to the brake fluid supply, said maximum pressure regulation means being in fluid communication with said valve means and with said return means.

15. The antiskid braking system of claim 14 wherein said maximum pressure means vents said brake fluid so that the maximum brake fluid pressure is proportional to the pressure of the brake fluid supply, said maximum pressure means being in fluid communication with the brake fluid supply.

16. A method of supplying braking force to a vehicle in a changing environment using a fluid braking system with a brake fluid supply and a wheel brake and wheels, comprising the following steps:
a. supply brake fluid from the brake fluid supply to the conventional wheel brake so long as the torque of the conventional wheel brake is no greater than the torque of the ground against the wheel;
b. stopping the flow of brake fluid from the brake fluid supply when the torque of the wheel brake exceeds the torque of the ground against the wheel; and
c. lowering the pressure of the brake fluid in the wheel brake until the torque of the wheel brake is equal to a fixed proportion of the torque of the ground against the wheel.

17. In a fluid braking system including an individual wheel braking system and source of pressurized braking fluid connected thereto, the improvement which comprises:
means for blocking fluid flow between the individual wheel braking system and the source of pressurized braking fluid, in response to excessive slipping of the individual wheel,
means for reducing the pressure in the individual wheel braking system while such fluid flow is blocked, and
means for adding braking fluid for preventing the reduction of the pressure below a preset minimum pressure.

18. In a fluid braking system including an individual wheel braking system and source of pressurized braking fluid connected thereto, the improvement which comprises:
means for blocking fluid flow between the individual wheel braking system and the source of pressurized braking fluid in response to the torque differential of the individual wheel between a first torque of the ground and the wheel and a second torque of the brake, and
means for continuous varying of the pressure in the individual wheel braking system while such fluid flow is blocked.

19. The antiskid braking system of claim 3 wherein said expandable volume means reduces the fluid pressure gradually.

20. The method of claim 16 wherein the lowering of the pressure of step c) is done gradually.

21. In a fluid braking system including an individual wheel braking system and source of pressurized braking fluid connected thereto, the improvement which comprises:
means for blocking fluid flow between the individual wheel braking system and the source of pressurized braking fluid in response to excessive wheel slipping;
means for reducing the pressure in the individual wheel braking system while such fluid flow is blocked; and
means for stopping such reduction of pressure and maintaining such reduced pressure when such excessive slipping stops.

22. In a fluid braking system including an individual wheel braking system and source of pressurized braking fluid connected to the inlet thereto, the improvement which comprises:
means for reducing the pressure in the individual wheel braking system by restricting the inlet in response to excessive slipping of the wheel; and
means for stopping such reduction of pressure and maintaining such reduced pressure when such excessive slipping stops.

23. The improvement of claim 1 wherein said means for continuous varying of the pressure includes means for continuous decreasing of the pressure in the individual wheel braking system while such fluid flow is blocked.

24. The improvement of claim 1 wherein said means for continuous varying of the pressure includes means for continuous increasing of the pressure in the individual wheel braking system while such fluid flow is blocked.

25. A braking system including an individual wheel braking system and source of pressurized braking fluid connected thereto, comprising:
means for blocking fluid flow between the individual wheel braking system and the source of pressurized braking fluid, in response to excessive slipping of the individual wheel; and means for increasing and decreasing the pressure in the individual wheel braking system while such fluid flow is blocked.

* * * * *